United States Patent [19]
Stumfall et al.

[11] Patent Number: 6,031,299
[45] Date of Patent: Feb. 29, 2000

[54] APPARATUS AND METHOD OF PROVIDING EMI FILTERING

[75] Inventors: David M. Stumfall, Santa Ana; Bruce R. Ferguson, Anaheim, both of Calif.

[73] Assignees: Sony Corporation, Tokyo, Japan; Sony Trans. Com, Inc., Irvine, Calif.

[21] Appl. No.: 08/934,319

[22] Filed: Sep. 19, 1997

[51] Int. Cl.[7] ..................................... G05F 1/70
[52] U.S. Cl. .......................... 307/106; 307/105; 363/45; 323/207
[58] Field of Search .................. 307/106, 105; 363/89, 40, 37, 48; 323/207

[56] References Cited

U.S. PATENT DOCUMENTS

| | | | |
|---|---|---|---|
| 4,591,963 | 5/1986 | Retotar | 363/37 |
| 4,980,812 | 12/1990 | Johnson et al. | 363/37 |
| 5,214,505 | 5/1993 | Rabowsky et al. | |
| 5,220,419 | 6/1993 | Sklar et al. | |
| 5,515,261 | 5/1996 | Bogdan | 363/89 |
| 5,600,549 | 2/1997 | Cross | 363/45 |
| 5,689,176 | 11/1997 | Deloy | 363/41 |

*Primary Examiner*—Albert W. Paladini
*Attorney, Agent, or Firm*—Blakely, Sokoloff, Taylor & Zafman LLP

[57] ABSTRACT

The present invention is a method and apparatus of providing EMI filtering through the implementation of a voltage sense circuit that is used in conjunction with a power correction circuit in an electromagnetic (EMI) filter system. The apparatus comprises a filter that receives an alternating current signal, where the filter has an input terminal and an output terminal. The apparatus also comprises a power correction circuit having a voltage reference input terminal and an output terminal. A voltage sense circuit having an input terminal is coupled to the input terminal of the filter. The voltage sense circuit has an output terminal that is coupled to the voltage input terminal.

21 Claims, 4 Drawing Sheets

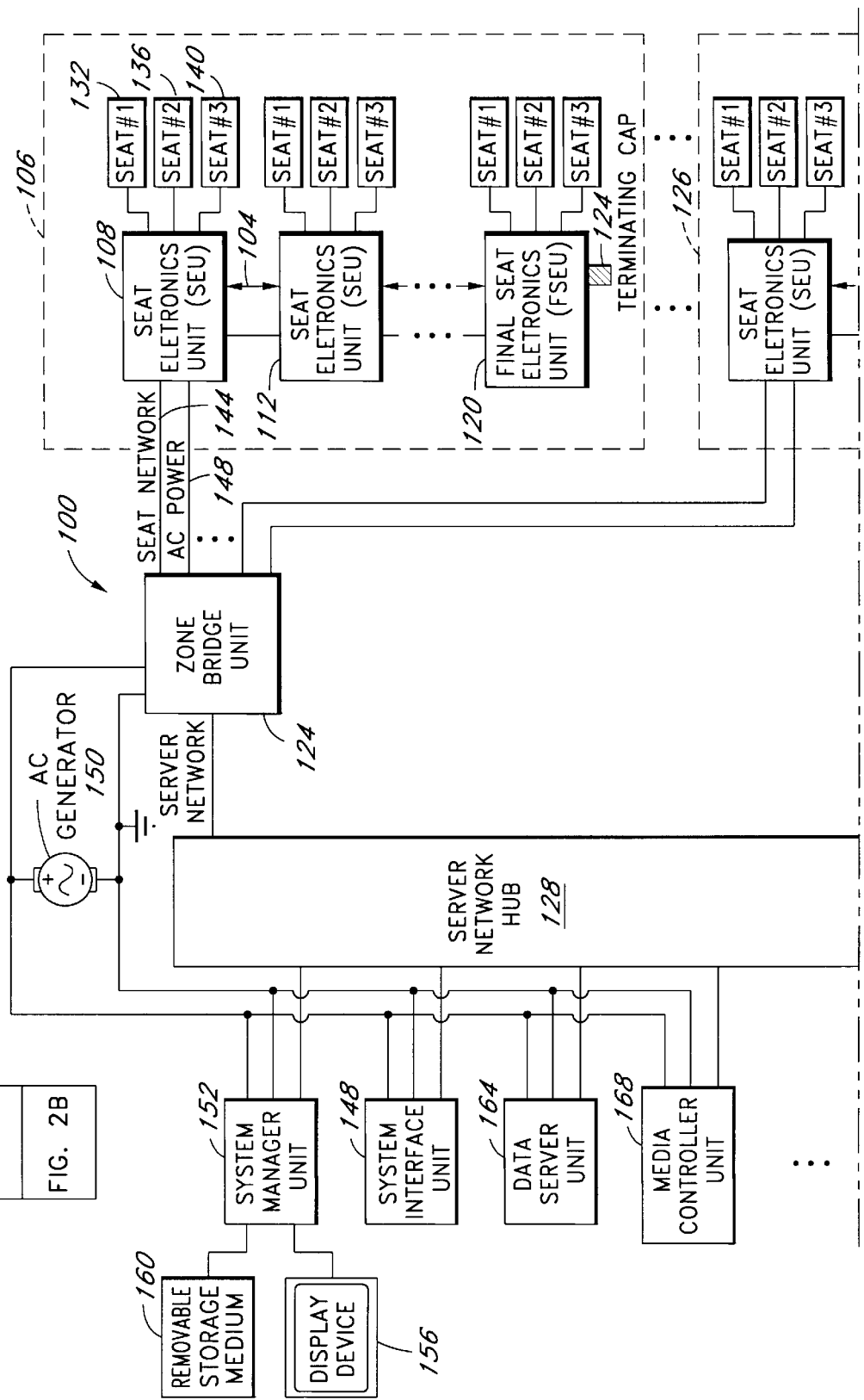

APPARATUS AND METHOD OF PROVIDING EMI FILTERING

BACKGROUND OF THE INVENTION

1. Field of the Invention

The present invention relates to filter systems, and more particularly, to a method and apparatus of providing an undistorted voltage reference signal to a power factor correction circuit that is implemented in an electromagnetic interference (EMI) filter system.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

On such commercial aircraft, there are typically a large number of electronic units having power supplies that are coupled to alternating current (AC) power sources. Power line distortion emitted from components in the power supply, typically termed conducted emissions, contribute to the appearance of a distorted load to the AC power source. Such conducted emissions, which are typically generated by the electronic components within the power supply or within circuits in the electronic units, can adversely affect the AC power source and other equipment sharing the AC power source. To minimize such conducted emissions, electronic units that are coupled to an aircraft's AC power source must undergo qualification testing having stringent standards. The limits of conducted emissions that are typically tested include: broadband and narrowband conducted current limits, harmonic current limits and minimum power factor requirements. The harmonic current limits and minimum power factor requirements apply directly to the performance of the power supply. The broadband and narrowband conducted current limits apply to the measurement of current in the AC power lines connected to an electronic unit and may not be related to the power supply itself.

To further minimize the effects of conducted emissions, a power line filter, such as an EMI filter, is typically incorporated within the power supply to suppress the electronic emissions that would otherwise be coupled on to the power lines. Units that are equipped with active power factor correction circuitry control the flow of power to the unit with the ultimate design goal of making the unit simulate a resistive load; that is, a load in which the current drawn from a sinusoidal voltage source is also an undistorted sinusoid and in phase with the source.

In typical commercial aircraft applications, it is necessary to use power factor correction to meet the power factor and harmonic current limits. One form of power factor correction involves the use of passive filters to attenuate the higher order harmonics of the power supply. For single phase power applications, these filters are too bulky and heavy to be used extensively on an aircraft. The preferred method for single phase systems is to use active power factor correction circuitry. Such an active, or electronically controlled approach, usually involves the implementation of a power factor correction (PFC) integrated circuit (IC) and supporting components to create a boost switching power converter topology which converts the rectified AC input voltage to a high DC output voltage, which can then be filtered and regulated down to voltages needed to power the electronic circuitry. The active PFC circuit regulates the load voltage by applying current to the load in phase with a reference voltage which is typically the output of the main bridge rectifier.

In such a conventional approach, the AC reference voltage is measured from the output of the main power rectifier, which is positioned on the load side of the EMI filter, as shown in FIG. 1. Such an approach tends to generate a distorted reference signal, because the high amplitude currents in the main rectifier provides distortion on the load side electronics. This in turn can create voltage distortion if there is a significant output impedance of the EMI filter at the current distortion frequencies. To minimize the EMI filter interaction, the passband of the EMI filter is traditionally designed to be wider than would be optimal. The design process then becomes a tradeoff between the two opposing performance criteria of either optimizing EMI suppression or minimizing harmonic current distortion.

Accordingly, there is a need in the technology for an apparatus and method of providing EMI filtering in electronic units implementing power factor correction circuitry, which provides both optimization of EMI filtering and minimization of harmonic current distortion. There is also a need in the technology to provide a sense circuit that is position independent with respect to the main rectifier so that the performance of the PFC portion of the electronic unit may be enhanced.

BRIEF SUMMARY OF THE INVENTION

The present invention is a method and apparatus of providing EMI filtering through the implementation of a voltage sense circuit that is used in conjunction with a power correction circuit in an electromagnetic (EMI) filter system. The apparatus comprises a filter that receives an alternating current signal, where the filter has an input terminal and an output terminal. The apparatus also comprises a power correction circuit having a voltage reference input terminal and an output terminal. A voltage sense circuit having an input terminal is coupled to the input terminal of the filter. The voltage sense circuit has an output terminal that is coupled to the voltage input terminal.

BRIEF DESCRIPTION OF THE DRAWINGS

FIGS. 2A and 2B illustrate an exemplary in-flight entertainment system 100 which implements the EMI filtering system of the present invention.

DETAILED DESCRIPTION OF THE INVENTION

Figure 2B:
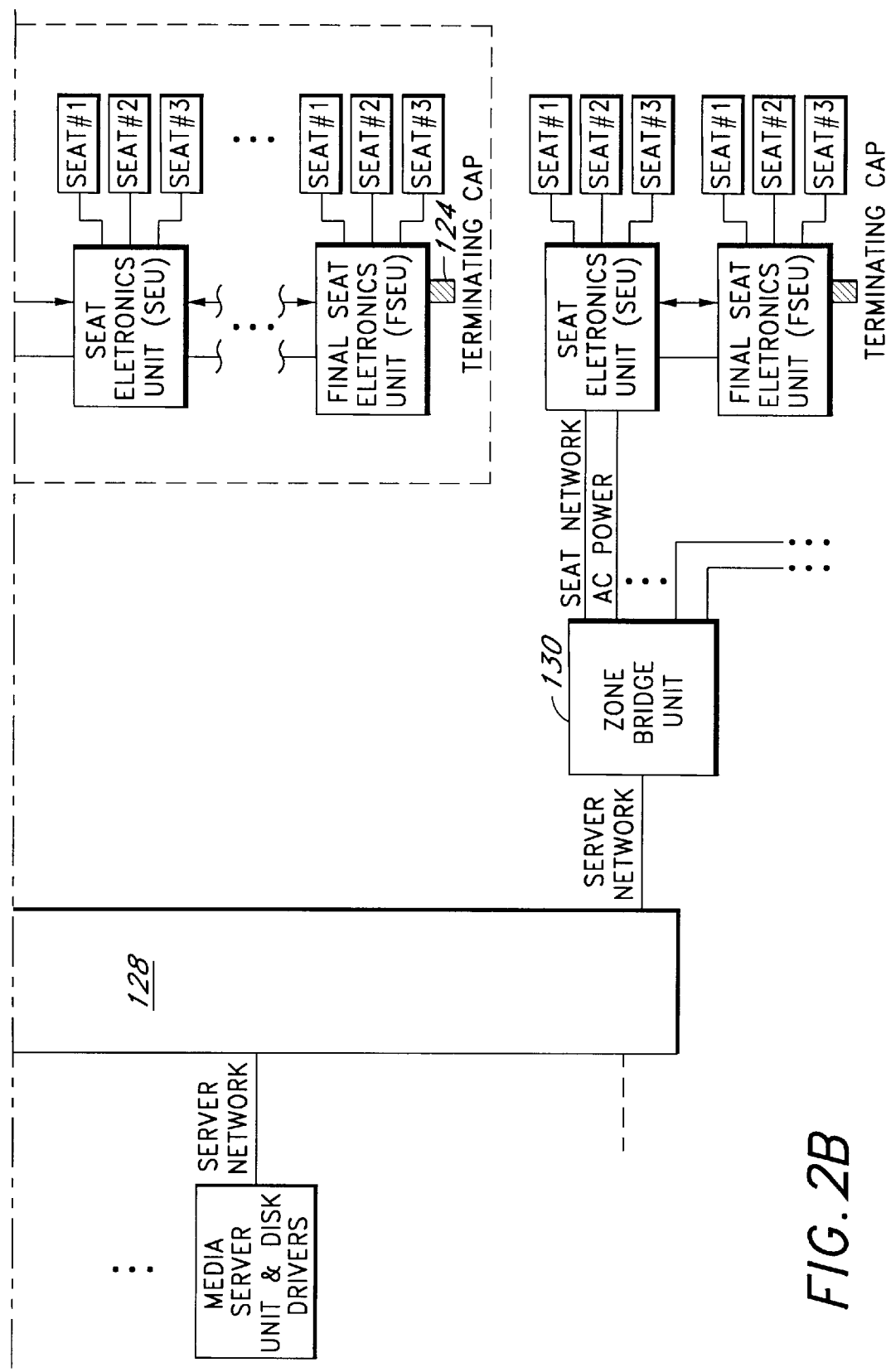

FIGS. 2A and 2B together show an overall schematic view of a flight entertainment system 100 which implements the EMI filtering system of the present invention. The flight entertainment system 100 includes an interconnect bus 104, a daisy chain 106 of interconnecting seat electronic units (SEUs) 108, 112, 120 and a terminating cap 124. Each daisy chain 106 is connected such that the output of one SEU is connected to the input of the next SEU until the final seat electronics unit (FSEU) 120 is reached. The SEUs receive the audio and video signals from a Zone Bridge Unit (ZBU) 124. Each ZBU 124 supports multiple daisy chains e.g. 106, 126, etc. A Server Network Hub 128 coordinates and communicates the information to and from multiple ZBUs 124, 130 to supporting electronics.

Each SEU, e.g. SEU 108, provides the necessary audio and video signals to support a number of passenger seats 132, 136, 140 in the passenger compartment of an aircraft. In one embodiment, an SEU may support two to three passenger seats depending on the aircraft configuration used, although the number may vary. In the described embodiment, up to 12 SEUs are daisy chained together, although the number of SEUs in a daisy chain may vary.

Each ZBU 124 services one section or zone of an aircraft. A ZBU 124 may service multiple daisy chains 106, 126. In one design, daisy chain e.g., 106, 126, etc. may serve an aisle of a plane while each ZBU 124 serves a plane section. The bus which forms each daisy chain 106, is terminated at the FSEU 120. The FSEU includes terminating cap 124 which terminates interconnect bus 104.

ZBU 124 distributes audio and video data on a seat network bus 144 and power along AC power line 148 to the various SEUs 108, 112. In one embodiment, power is provided by an AC generator 150 located on the aircraft. The system may also receive data, such as credit card information, entertainment requests, or merchandise orders, from seat electronics (not shown) in the vicinity of passenger seat 132, 136, 140. The respective SEU unit 108 receives the data and may then transfer the data to the respective ZBU 124 via seat network bus 144. This information may be further transmitted through the server network hub 128 to other electronics aboard the aircraft, or in the case of telephone or other communication to a public switched telephone network ("PSTN") or other external networks outside of the aircraft through a system interface unit 148. A system manager unit (SMU) 152 oversees operation of the IFE. The SMU 152 is coupled to a display device 156 which displays passenger requests and system status information. A floppy drive 160 is also provided for storing data.

The IFE, including the SMU 152 and the SEUs 108, 112, 120 is designed to perform self diagnostic checks. In particular, the SEUs perform diagnostic checks and may forward error messages to the SMU. The SMU 152 then displays the error on display device 156 or the information is stored on a floppy disk or other removable storage medium 160 for further use or analysis. This information enables technicians or maintenance personnel to quickly troubleshoot the IFE system. A server network hub 128 may further be coupled to other units which provide information such as Data Server Units (DSUs) 164 and Media Controller Units (MCUs) 168 which provide the video/audio contact.

Each SEU 108, 112, 120 in a daisy chain 106, obtains its supply voltage and power from its own power supply (not shown), which in turn obtains supply voltage and current from the aircraft's AC generator 150. To minimize and/or eliminate power line distortion emitted from components in the power supply, an EMI filtering system 200 (see FIG. 3) is implemented as an interface between the AC generator 150 and the power supply. Such power line distortions, also known as conducted emissions, are typically generated by the electronic components within the power supply or within or circuits of the SEU 108, and can adversely affect the AC generator 150 and other equipment sharing the AC generator 150 if left unchecked. If such power line distortions are too large, they can result in causing the entire system to exceed acceptable system EMI limits.

The EMI filtering system 200 may also be used as an interface between the AC generator 150 and other electronic systems which provide in-flight entertainment services such as those shown in FIGS. 2A and 2B. These electronic systems include, but are not limited to, System Manager Unit 152, System Interface Unit 148, Data Server Unit 164, and Media Controller Unit 168. It is apparent to one of ordinary skill in the art that the EMI filtering system and/or the voltage sense circuit of the present invention may be implemented in any system which utilizes power supplies implementing power correction circuits, and may not be limited to power supplies in airborne applications.

Figure 1:
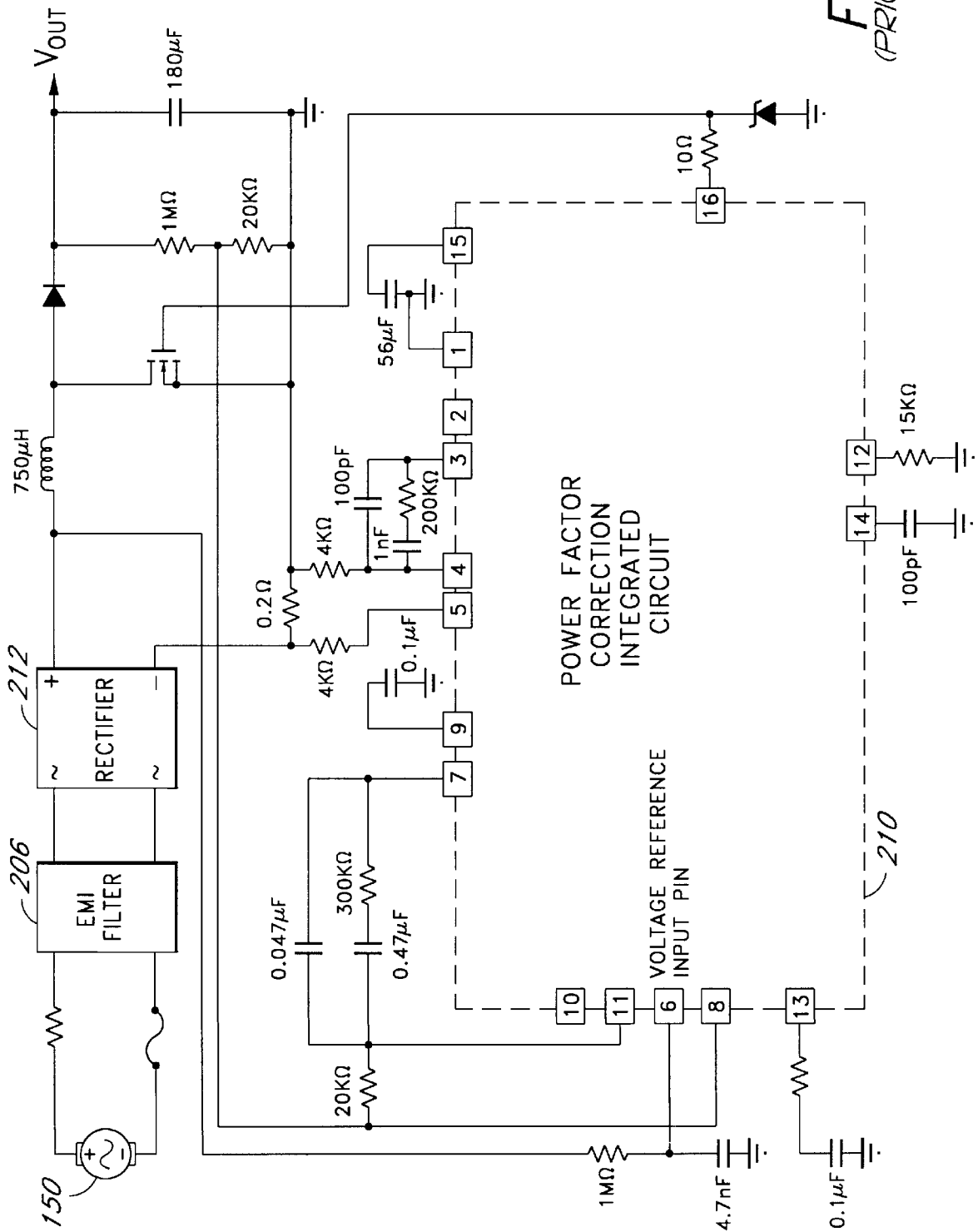
FIG. 1 illustrates an EMI filter system of the prior art.
Figure 3:
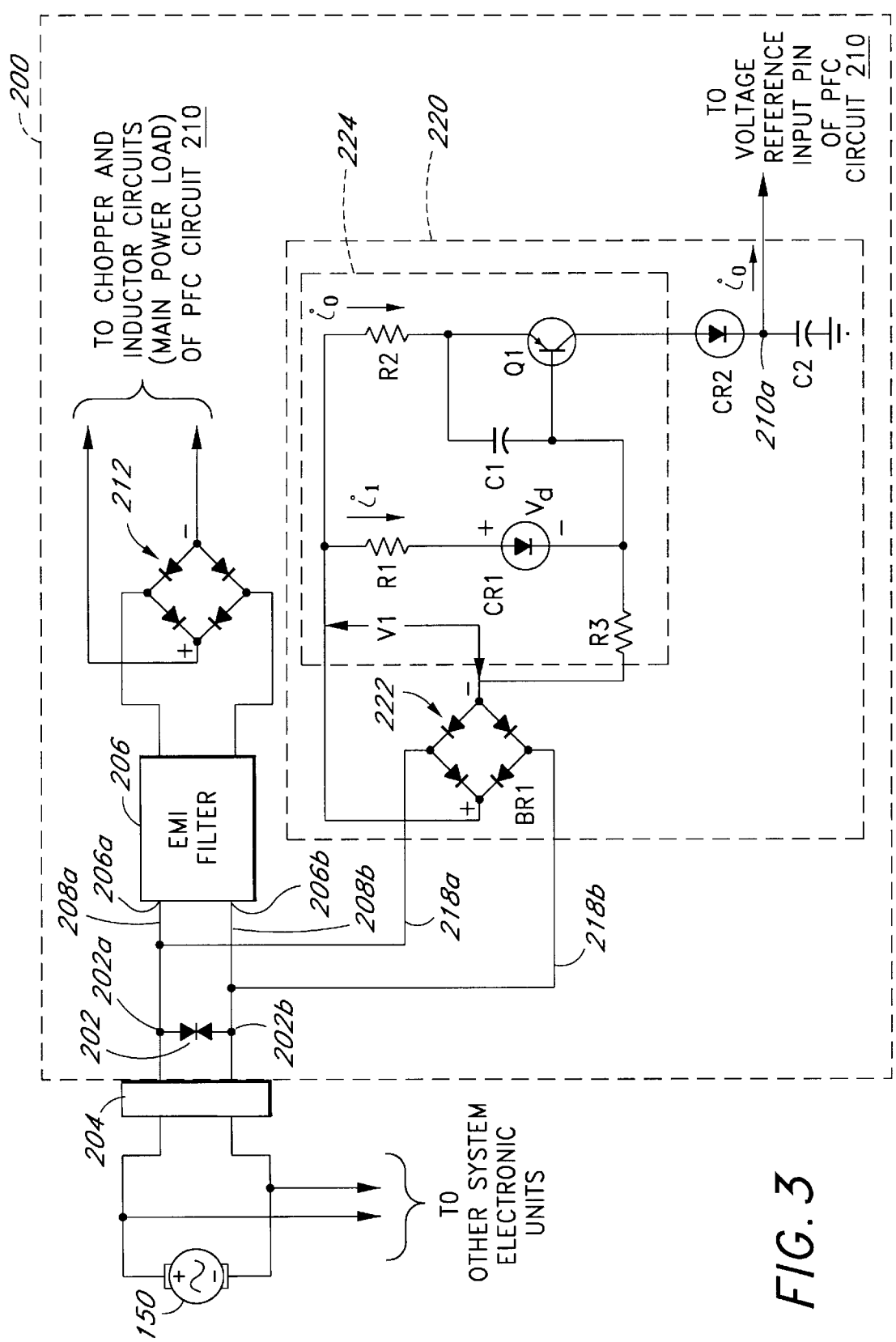
FIG. 3 is a schematic diagram of one embodiment of the EMI filtering system 200 which implements a voltage sense circuit 220 in accordance with the teachings of the present invention.

As shown in FIG. 3, the EMI filtering system 200 comprises a transient suppresser 202, which is coupled in parallel to the AC generator 150 via connector 204, and an EMI filter 206 having first and second input terminals 206a, 206b, that are coupled to each end 202a, 202b, of the transient suppresser 202 via signal lines 208a and 208b, respectively. The output terminals of the EMI filter 206 are coupled to the chopper and inductor circuits (not shown) of a power factor correction circuit 210, via a main rectifying circuit 212, as is well-known in the prior art as exemplified by the circuit shown in FIG. 1. In one embodiment, the power correction circuit 210 is that manufactured by Linear Technology under the part designation LT1248. Each end 202a, 202b, of the transient suppresser 202 is also coupled to a voltage sense circuit 220 via signal lines 218a and 218b, respectively. The voltage sense circuit 220 comprises a rectifier 222 that is coupled to the line side of the EMI filter 206 for sensing the actual AC source voltage at the input terminals 206a, 206b of the EMI filter 206, rather than at the load side of the EMI filter 206, which provides a distorted AC voltage reference waveform.

The voltage sense circuit 220 also comprises a current source circuit 224 which includes a diode CR1, a transistor Q1 and resistors R1, R2 and R3. The inputs to the current source circuit 224 is coupled to the outputs of a rectifier 222. In one embodiment, R1 is coupled in series with the diode CR1 and resistor R3, and the combination of R1, CR1, and R3 is coupled in parallel across the output terminals of the rectifier 222. In particular, one end of R1 is coupled to the positive output terminal of the rectifier 222 and one end of R3 is coupled to the negative output terminal of the rectifier 222. One end of R2 is coupled in series with Q1, while the other end of R2 is coupled to R1 and the positive terminal of the rectifier 222. The base of Q1 is coupled to the negative terminal of CR1. Typical examples of these components include a 1 KΩ value for R1, a 6.2 KΩ value for R2, a 153.8 KΩ value for R3, a 200 pF capacitance value for C1 and a 470 pF capacitance value for C2. An example of the diode CR1 or CR2 is that manufactured by Motorola under the part designation MMBD914L, while an example of Q1 is that manufactured by Motorola under the part designation MMBTA92.

The operation of the current source circuit 220, in the embodiment discussed above, will now be described. CR1, R1 and R3 are used to bias Q1 while R2 scales the current delivered by Q1 to a voltage reference input terminal 210a of the power factor correction circuit 210, to be proportional to the ratio of R1/R2. The current $i_1$ through R1 is the amplitude of the rectified AC input voltage $V_1$ divided by the summation of the resistance values of $$R_1 + R_3 \text{ i.e. } i_1 \cong \frac{V_1}{R_1 + R_3}.$$

Since $i_1 R_1 + V_d = i_0 R_2 + V_{be}$
where $V_d$ is the voltage drop across diode CR1,
$i_0$ is the current through $R_2$,
$V_{be}$ is the voltage across the base and emitter of $Q_1$, and $$V_d \approx V_{be},$$
$$=> i_1 R_1 = i_0 R_2$$
$$i_0 = \frac{R_1}{R_2} i_1$$
$$= \left(\frac{R_1}{R_2}\right)\left(\frac{V_1}{R_1 + R_3}\right)$$

Thus, in the example above, $i_1$=1 mA, and $i_0$=160 $\mu$A.

A capacitor, C1 coupled between one end of R2 and the base of Q1, may be used to prevent the undesirable high frequency oscillations of Q1. A DC bias is maintained at the voltage reference input terminal 210*a* to the power correction circuit 210 by means such as diode CR2 and capacitor C2. Capacitor C2 also provides high frequency filtering at the input resistance of the voltage reference input terminal 210*a*. In one embodiment, the voltage reference input terminal 210*a* is pin 6 of power factor correction integrated circuit manufactured by Linear Technology under the part designation LT1248.

Through the implementation of the principles of the present invention, EMI filtering in power supplies may be optimized and harmonic current distortion may be minimized, while the weight of the entire system may be minimized.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed:

1. An apparatus for filtering electromagnetic interference in an electronic system, comprising:
   a power supply having an input terminal, a power factor control input, and an output terminal, said output terminal supplying power to a load;
   a filter that receives an alternating current signal, said filter having an input terminal that receives the alternating current signal and an output terminal connected to the input terminal of the power supply;
   a power factor correction circuit having a voltage reference input terminal and an output terminal connected to the power factor control input of the power supply; and
   a voltage sense circuit having an input terminal that is coupled to the input terminal of the filter, said voltage sense circuit having an output terminal that is coupled to the voltage reference input terminal, said voltage sense circuit further comprising,
   a rectifier having an input terminal coupled to the input terminal of the filter, said rectifier having an output terminal, and
   a current source circuit having an input terminal that is coupled to the output terminal of said rectifier, said circuit providing a scaled, rectified current signal to the output terminal of the voltage sense circuit.

2. The apparatus as recited in claim 1, wherein said rectifier further comprises a full-wave rectifier.

3. The apparatus as recited in claim 2, wherein said rectifier has a first output terminal and a second output terminal and where said current source circuit comprises a first resistor coupled at one end with the first output terminal of said rectifier, said first resistor being coupled at the other end with one end of a second resistor, the other end of said second resistor being coupled to the second output terminal of said rectifier, said current source circuit also comprising a third resistor that is coupled at one end with said first resistor, and a transistor having a collector, an emitter and a base, said emitter of said transistor being coupled to a second end of said third resistor, said base of said transistor being coupled to said second end of said third resistor and said second end of said first resistor, said collector of said transistor providing the scaled rectified current signal.

4. The apparatus as recited in claim 3, wherein the rectified current signal is scaled in accordance with a value that is proportional to a resistance of said first resistor divided by a resistance of said second resistor.

5. The apparatus as recited in claim 3, wherein said current source circuit further comprises a diode coupled between said first resistor and said second resistor.

6. The apparatus as recited in claim 3, wherein said current source circuit further comprises a capacitor coupled between said emitter and said base of said transistor.

7. The apparatus as recited in claim 3, wherein said current source circuit further comprises a second diode coupled to said collector of said transistor.

8. A conducted emissions electromagnetic interference filtering system in an in-flight entertainment system, comprising:
   an in-flight entertainment system electronics unit;
   a power supply having an input terminal, a power factor control input, and an output terminal, said output terminal being coupled to the in-flight entertainment system electronics unit;
   a filter that receives an alternating current signal, said filter having an input terminal that receives the alternating current signal and an output terminal;
   a power factor correction circuit having a voltage reference input terminal and an output terminal that is coupled to the input terminal of said power supply connected to the power factor control input of the power supply; and
   a voltage sense circuit having an input terminal that is coupled to the input terminal of said filter, said voltage sense circuit having an output terminal that is coupled to the voltage reference input terminal, said voltage sense circuit further comprising,
   a rectifier having an input terminal coupled to the input terminal of the filter, said rectifier having an output terminal, and
   a current source circuit having an input terminal that is coupled to the output terminal of said rectifier, said circuit providing a scaled, rectified current signal to the output terminal of the voltage sense circuit.

9. The system as recited in claim 8, wherein said rectifier further comprises a full-wave rectifier.

10. The system as recited in claim 9, wherein said rectifier has a first output terminal and a second output terminal and where said current source circuit comprises a first resistor coupled at one end with the first output terminal of said rectifier, said first resistor being coupled at the other end with one end of a second resistor, the other end of said second resistor being coupled to the second output terminal of said rectifier, said current source circuit also comprising a third resistor that is coupled at one end with said first resistor, and a transistor having a collector, an emitter and a base, said emitter of said transistor being coupled to a second end of said third resistor, said base of said transistor being coupled to said second end of said third resistor and said second end of said first resistor, said collector of said transistor providing the scaled rectified current signal.

11. The system as recited in claim 10, wherein the rectified current signal is scaled in accordance with a value that is proportional to a resistance of said first resistor divided by a resistance of said second resistor.

12. The system as recited in claim 10, wherein said current source circuit further comprises a diode coupled between said first resistor and said second resistor.

13. The system as recited in claim 10, wherein said current source circuit further comprises a capacitor coupled between said emitter and said base of said transistor.

14. The apparatus as recited in claim 10, wherein said current source circuit further comprises a second diode coupled to said collector of said transistor.

15. A method for filtering electromagnetic interference in an electronic system, comprising:

providing a power supply having an input terminal, a power factor control input, and an output terminal, said output terminal supplying power to a load;

providing a filter that receives an alternating current signal, said filter having an input terminal that receives the alternating current signal and an output terminal connected to the input terminal of the power supply;

providing a power factor correction circuit having a voltage reference input terminal and an output terminal connected to the power factor control input of the power supply; and coupling an input terminal of a voltage sense circuit to the input terminal of the filter and coupling an output terminal of said voltage sense circuit to the voltage reference input terminal, said coupling further comprising, coupling an input terminal of a rectifier to the input terminal of the filter, and coupling an input terminal of a current source circuit to an output terminal of said rectifier, said current source circuit providing a scaled, rectified current signal to the output terminal of the voltage sense circuit.

16. The method as recited in claim 15, wherein said rectifier further comprises a full-wave rectifier.

17. The method as recited in claim 16, wherein in the step of coupling an input terminal to a rectifier, said rectifier has a first output terminal and a second output terminal, and wherein in the step of coupling an input terminal of a current source circuit, said current source circuit comprises a first resistor coupled at one end with the first output terminal of said rectifier, said first resistor being coupled at the other end with one end of a second resistor, the other end of said second resistor being coupled to the second output terminal of said rectifier, said current source circuit also comprising a third resistor that is coupled at one end with said first resistor, and a transistor having a collector, an emitter and a base, said emitter of said transistor being coupled to a second end of said third resistor, said base of said transistor being coupled to said second end of said third resistor and said second end of said first resistor, said collector of said transistor providing the scaled rectified current signal.

18. The method as recited in claim 17, wherein the step of providing a scaled, rectified current signal comprises the step of scaling the rectified signal in accordance with a value that is proportional to a resistance of said first resistor divided by a resistance of said second resistor.

19. The method as recited in claim 17, further comprising the step of coupling a diode between said first resistor and said second resistor.

20. The method as recited in claim 17, further comprising the step of coupling a capacitor between said emitter and said base of said transistor.

21. The method as recited in claim 17, further comprising the step of coupling a second diode to said collector of said transistor.

* * * * *